(12) United States Patent
Rawson et al.

(10) Patent No.: US 7,132,052 B2
(45) Date of Patent: Nov. 7, 2006

(54) SYSTEM FOR THE PURIFICATION AND REUSE OF SPENT BRINE IN A WATER SOFTENER

(75) Inventors: James Rulon Young Rawson, Clifton Park, NY (US); Raul Eduardo Ayala, Clifton Park, NY (US)

(73) Assignee: General Electric Company, Niskayuna (JP)

( * ) Notice: Subject to any disclaimer, the term of this patent is extended or adjusted under 35 U.S.C. 154(b) by 195 days.

(21) Appl. No.: 10/734,485

(22) Filed: Dec. 11, 2003

(65) Prior Publication Data

US 2005/0126999 A1    Jun. 16, 2005

(51) Int. Cl.
B01D 63/00 (2006.01)
B01J 49/00 (2006.01)
C02F 9/00 (2006.01)

(52) U.S. Cl. .............. 210/652; 210/660; 210/663; 210/670; 210/195.2; 210/257.2

(58) Field of Classification Search ............ 210/652, 210/660, 663, 670, 195.2, 257.2, 805, 681, 210/688

See application file for complete search history.

(56) References Cited

U.S. PATENT DOCUMENTS

| | | | |
|---|---|---|---|
| 3,639,231 A * | 2/1972 | Bresler | 210/638 |
| 3,964,999 A * | 6/1976 | Chisdes | 210/651 |
| 4,207,397 A * | 6/1980 | Davis et al. | 521/26 |
| 4,806,244 A * | 2/1989 | Guilhem | 210/638 |
| 5,254,257 A | 10/1993 | Brigano et al. | |
| 5,639,377 A * | 6/1997 | Banham et al. | 210/677 |
| 5,718,828 A * | 2/1998 | Jangbarwala et al. | 210/677 |
| 5,770,090 A * | 6/1998 | Lewis, III | 210/662 |
| 5,932,106 A * | 8/1999 | San Miguel Bento | 210/674 |
| 6,004,464 A | 12/1999 | Lien | |
| 6,077,439 A * | 6/2000 | El-Ammouri et al. | 210/665 |
| 6,117,315 A | 9/2000 | Masson | |
| 6,195,825 B1 | 3/2001 | Jones | |
| 6,224,731 B1 | 5/2001 | Mani | |
| 6,508,936 B1 * | 1/2003 | Hassan | 210/652 |
| 6,669,849 B1 * | 12/2003 | Nguyen et al. | 210/638 |
| 6,747,065 B1 * | 6/2004 | Paszkowski | 516/83 |
| 6,783,681 B1 * | 8/2004 | Mueller et al. | 210/650 |
| 2003/0015470 A1 | 1/2003 | Muralidhara et al. | |

OTHER PUBLICATIONS

Masaru Kurihara, et al., *High Recovery / High pressure Membranes for Brine Conversion SWRO Process Development and its Performance Data*, conference proceedings, European Desalination Society and International Water Services Association, Las Palmas, Nov. 9-12, 1999. Also Desalination 125.

David H. Paul, *Membrane Separation: Primary Factors Influencing RO Membrane Permeate Flow*, Water Conditioning & Purification, Apr. 2002, pp. 30-32.

* cited by examiner

*Primary Examiner*—Ana Fortuna
(74) *Attorney, Agent, or Firm*—Jason K. Klindtworth; Jean K. Testa

(57) ABSTRACT

System and method for purifying and recycling spent brine in a water softener are provided. The system may be made up of a cation exchange resin tank fluidly coupled for passing spent brine comprising monovalent and divalent ions. A fluid mixer valve is coupled to the resin tank and to a water tank to dilute the spent brine to a desired concentration of a regenerant salt, e.g., NaCl. An ion-separation device is fluidly coupled to the fluid mixer valve to receive the diluted spent brine and separate the diluted spent brine into first and second streams. The first of the streams comprises monovalent ions and the second of the streams comprises divalent ions.

14 Claims, 2 Drawing Sheets

SYSTEM FOR THE PURIFICATION AND REUSE OF SPENT BRINE IN A WATER SOFTENER

BACKGROUND OF THE INVENTION

The present invention is generally related to water softeners, and, more particularly, to system and techniques for the filtration and reuse of spent brine, such as may be produced during the regeneration of salt-based ion-exchange water softening systems.

Residential water softeners typically use cation exchange resins, which remove ions, such as calcium and magnesium ions, which commonly contribute to the hardness of water. During the ion exchange process, the resin releases a cation, e.g., a divalent cation, into the softened water. Periodically, preferably when the resin bed becomes saturated with the divalent cations, the resin is regenerated by flushing it with a concentrated regenerant aqueous solution, such as salt (e.g., sodium chloride) brine. In the process, the cations producing hardness (calcium and magnesium, for instance) are released into the regeneration stream that is disposed of into the municipal sewer system.

Unfortunately, excess sodium chloride from the regenerant brine solution is also discarded to the sewer system. Because many municipalities nowadays treat sewer water for agricultural irrigation or other purposes, discharge of brine is often no longer acceptable because the discharged brine would introduce excessive salinity to the agricultural fields and present environmental pollution of the ponds and nearby lands being irrigated. As a consequence, many municipalities may enact regulations effectively banning the discharge of brine from the regeneration of residential water softeners.

In addition, residential users must periodically buy pelletized salt in heavy bags and carry them to the location of the ion exchange softener, which is often not easily accessible.

BRIEF DESCRIPTION OF THE INVENTION

In view of the foregoing considerations, the inventors of the present invention have innovatively recognized a brine regeneration system by which the mixture of monovalent ions (e.g., brine salt) and divalent ions (e.g., hardness-causing ions) in the spent regeneration stream are separated. This allows for the brine to be recycled and reused for additional cycles of resin regeneration while the hardness ions may be discharged in an environmentally friendly fashion to the sewer system.

Generally, the present invention fulfills the foregoing needs by providing in one aspect thereof, a water softener comprising a cation exchange resin tank fluidly coupled for passing spent brine comprising monovalent and divalent ions. A fluid mixer valve is coupled to the resin tank and to a water tank to dilute the spent brine to a desired concentration of a regenerant salt (sodium chloride or NaCl). An ion-separation device is fluidly coupled to the fluid mixer valve to receive the diluted spent brine and separate the diluted spent brine into first and second streams. The first of the streams substantially comprises monovalent ions and the second of the streams substantially comprises divalent ions.

In another aspect thereof, the present invention further fulfills the foregoing needs by providing a method for purifying and recycling spent brine in a water softener. The method allows passing from a cation exchange resin tank spent brine comprising monovalent and divalent ions. The method further allows for diluting the spent brine to a desired concentration of a regenerant salt. The diluted spent brine is separated into first and second streams. The first of the streams substantially comprises monovalent ions and the second of the streams substantially comprises divalent ions.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
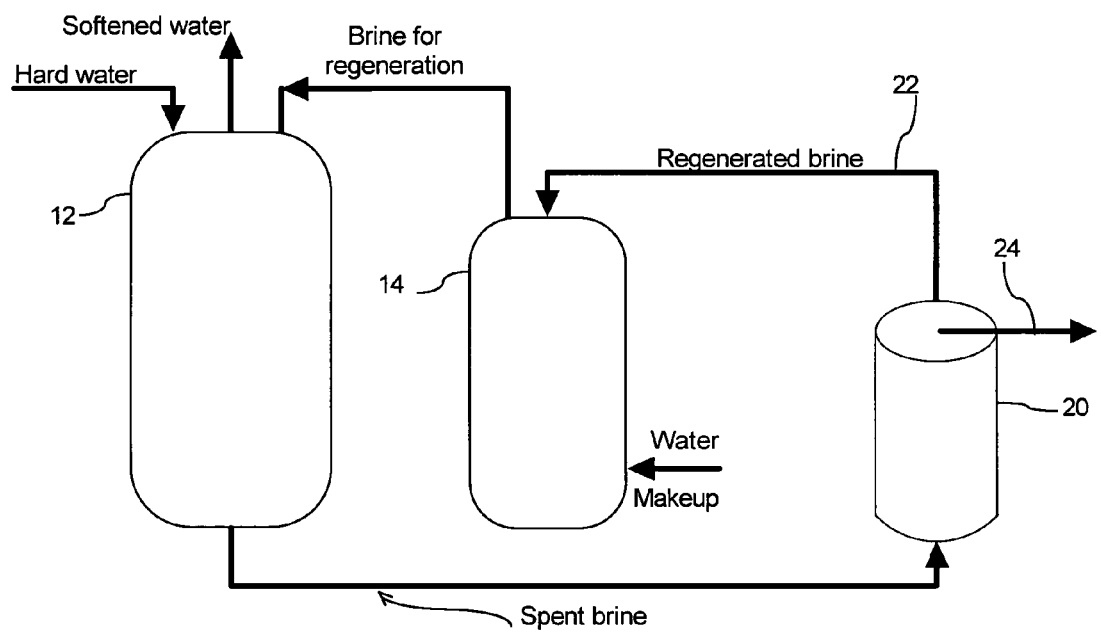
FIG. 1 illustrates a schematic representation of an exemplary system for purifying spent brine in a water softener.

Below is generic background information solely for the purpose of providing a cursory description of one exemplary operation of a typical water softener. This background information in no way should be construed as limiting the scope of the present invention described further below. As shown in FIG. 1, an exemplary water conditioner system 10 may comprise at least two tanks: a resin tank 12 and a brine (e.g., salt) tank 14. The resin tank is filled with a resin that, for example, comprises relatively small beads of a suitable material, e.g., cross-linked polystyrene sulfonic acid. This resin may be referred to in the art as a cation resin. The beads may be constructed to exhibit a permanent electrical charge. The charge may cause the beads to attract positively charged ions. For example, the resin may be initially placed into service with $Na^+$ ions on the beads. When the hardness ions (e.g., calcium or $Ca^{2+}$ and magnesium or $Mg^{2+}$) come in contact with the sodium ions ($Na^+$), such ions would displace the $Na^+$ on the beads. The $Na^+$ is eventually dissolved into the water. This sodium generally leaves the resin tank and may be delivered to the tap with the treated water. When most of the $Na^+$ is removed from the resin beads, regeneration equipment should start the regeneration process. The resin may then be regenerated by drawing in a relatively high concentration of brine (e.g., NaCl or KCl) solution from the brine tank. This salt solution is washed over the depleted resin. The salt solution may contain $Na^+$ and chloride ions ($Cl^-$). The $Na^+$ is placed back onto the resin beads and the $Ca^{2+}$, $Mg^{2+}$ and $Cl^-$ are washed down the drain. The resin may then be rinsed with fresh water to remove any remaining residual salt. Additional water may be added to the brine tank to dissolve salt for the next regeneration cycle. The equipment may then command a service mode and there would be treated water available from the softener.

In accordance with aspects of the present invention, the exemplary embodiment illustrated in FIG. 1 uses a nanofiltration membrane 20 to separate the spent brine into two streams: stream 22 comprises regenerated or purified brine (essentially monovalent ions, such as sodium and chloride) and stream 24 comprises waste hardness (essentially divalent ions, such as calcium, magnesium and carbonates) in order to deal with the environmental requirements for discharge to sewer. It will be appreciated by those skilled in the art that a nanofiltration membrane is just one example of a device that can separate the monovalent ions from the divalent ions that may be present in the spent brine. For some applications, a "loose" reverse osmosis (RO) device, electrodialysis device, or deionization device may be used in lieu of or in combination with the nanofiltration membrane.

The foregoing embodiment may be useful for cases where the nanofiltration membrane 20 is capable of separating the divalent ions in the presence of a high concentration of monovalent ions. In practice, many nanofiltration membranes (as presently available in the market) may not be able to achieve complete separation of hardness at high monovalent ion concentration. As an example, presently commercially available nanofiltration membranes will separate divalent ions from water at efficiencies approaching 99% or better whenever the concentration of monovalent ions is substantially close to zero (e.g., approximately below 0.1% wt NaCl). However, the efficiency to separate divalent ions that produce hardness may decrease to approximately 50% when the monovalent concentration is at approximately 1% wt NaCl or higher.

In one exemplary embodiment, the concentrated brine from a regeneration cycle of the ion exchange softener, may be typically saturated at approximately near 20–26% NaCl. It would be desirable to reuse the brine multiple times without discharging it to the sewer system. As described in greater detail below in the context of FIG. 2, another embodiment is contemplated to effectively separate hardness when the nanofiltration membranes alone may not be able to achieve the separation to a satisfactorily high degree in the presence of high brine (e.g., NaCl) concentrations.

Figure 2:
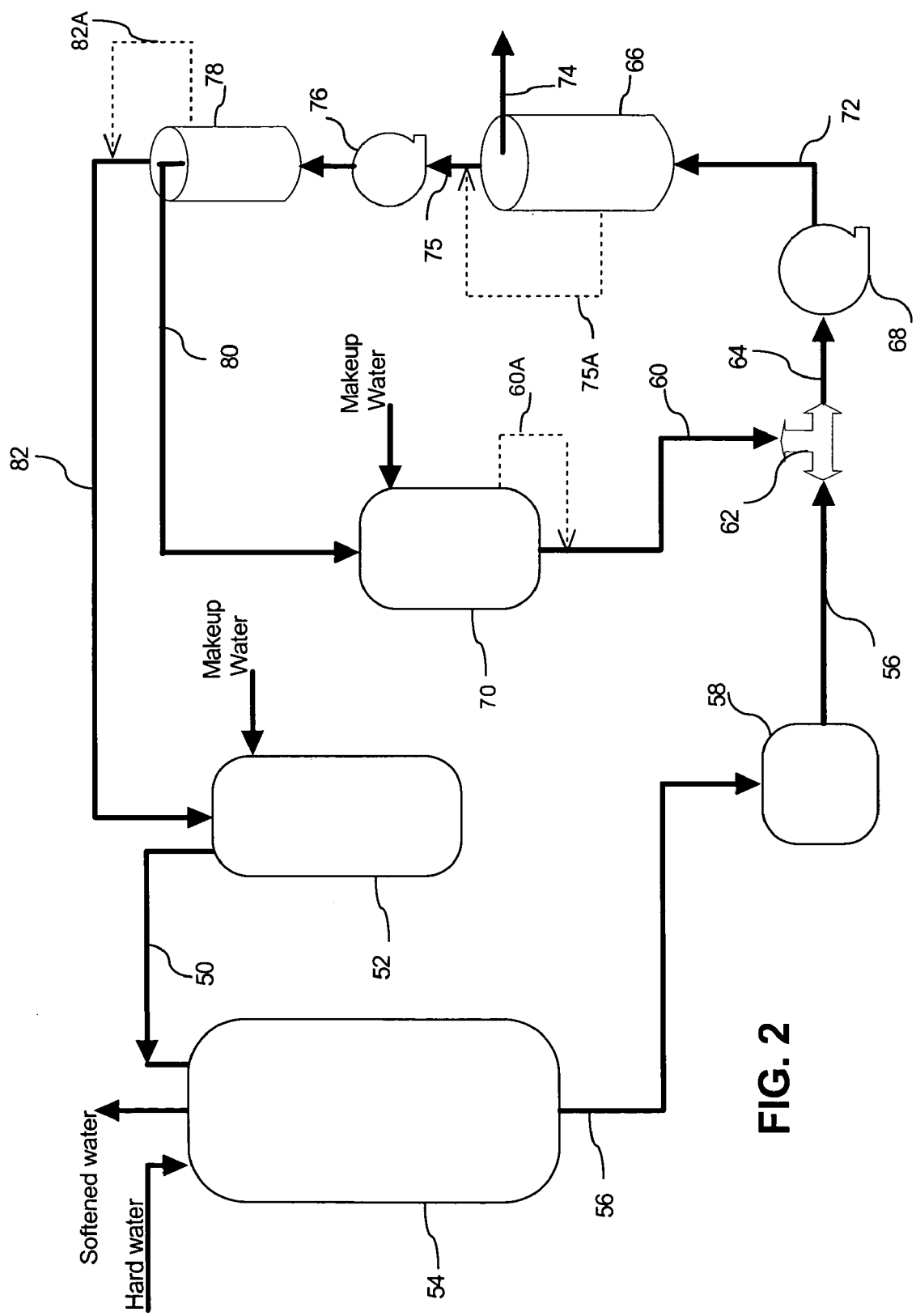
FIG. 2 illustrates a schematic representation of an exemplary system for purifying and recycling spent brine in a water softener.

Referring Now to FIG. 2:

A concentrated brine (stream 50) for regenerating an ion exchange softening system resin may be obtained in a brine storage tank 52 from pelletized salt (sodium chloride), for example. Stream 50 leaving the brine storage tank is passed to an ion-exchange resin bed in a resin tank 54 where the concentration of sodium may be reduced from close to saturation (approximately 26% wt NaCl or so) to approximately from about $\frac{1}{5}^{th}$ to about $\frac{1}{10}^{th}$ of its saturation point (stream 56). This stream is commonly called spent brine because it comprises a residual amount of brine plus the divalent cations removed from the resin bed during resin regeneration. Stream 56 may be collected in a spent brine storage tank 58.

Stream 56 may be diluted with a stream 60, which may comprise either fresh water or predominantly softened water, from a ratio of approximately about 1:1 to about 10:1 or higher, passing through a suitable mixing valve 62 or equivalent device. The purpose of this diluting step is to reduce the concentration of sodium chloride in stream 56 so as to produce a diluted stream 64 equal to or below the concentration of monovalent ions that a nanofiltration membrane 66 can tolerate to separate the divalent (hardness) ions at high efficiencies (typically 70% or higher, and up to about 99% hardness removal in one exemplary embodiment).

A pumping device 68 can be used to draw fluid from the spent brine holding tank 58 and/or a recycled water tank 70 to the nanofiltration membrane 66. In one exemplary embodiment, typical pressures for a stream 72 entering the nanofiltration membrane 66 need not be much higher than pressures found in residential city water supplies. If necessary for a given application, the pressure can be increased slightly with the pumping device 68 (or an auxiliary pump) to approximately about 100–150 psi.

Stream 72 comprises a diluted hard water stream that enters the nanofiltration membrane 66 and is separated into two streams: a concentrated stream of divalent ions, such as calcium, magnesium and carbonates (stream 74) and a diluted softened stream (stream 75) that comprises just the monovalent ions (e.g., sodium and chloride) and is essentially free of hardness. Stream 74 is discharged to the sewer as a safe discharge essentially free of the sodium chloride monovalent ions. In one exemplary embodiment, multiple passes through nanofiltration membrane 66 may be performed in an optional loop arrangement (not shown in FIG. 2) to achieve higher separation efficiencies.

The diluted soft stream (stream 75) may be pumped through a pumping device 76 to a sufficiently high level of pressure, e.g., approximately 70 psi or higher, and passes through a reverse osmosis (RO)-type membrane device 78, where the demineralized water (stream 80) is available for further recirculation and eventually the dilution of stream 56. The purpose of RO device 78 may be two-fold: 1) to reclaim the water present in stream 75 (i.e, the dilute spent brine) for further utilization, and 2) to reconstitute the brine for further reuse. The reclaimed water stream 80 is sent back to the recycled water tank 70 for further use as diluent. The reconstituted brine stream 82 is sent to brine storage 52 to make more brine and/or increase its salt concentration.

In one exemplary embodiment, a bleed stream 75A, a bleed stream 82A, and a bleed stream 60A could be added off stream 75, stream 82, and stream 60, respectively, to allow for draining or discharging of fluids used in the cleaning or maintenance of membrane device 66, membrane device 78, and storage device 70, respectively.

Unlike sea water desalination, the pressure in the RO membrane device does not have to be very high because the osmotic pressure of a diluted water stream is relatively low. In some applications one may use a loose reverse osmosis (RO) device, an electrodialysis device, or a deionization device in lieu of RO device 78.

As will be appreciate by those skilled in the art, a general rule typically employed in water treatment is that for every 100 mg/L of ions in the treated water, the osmotic pressure that needs to be overcome is about 1 psi. For instance, assuming that stream 75 comprises a total dissolved solids (TDS) concentration of 1% wt (10,000 mg/L or ppm), this would require approximately 100 psi of osmotic pressure, which is a pressure level readily achievable with a small pump in a residential system. The monovalent ions present in stream 75 are separated and concentrated in stream 82, the reconstituted brine.

In one exemplary embodiment, a design goal would be to provide a relatively high water separation efficiency in the RO membrane, for example at least 50% or higher, in order to bring the concentration of monovalent ions to at least 3% wt NaCl, so that most of the water is recovered as stream 80 and sent to the recycled water tank 70. The reconstituted brine (stream 82) will then comprise a small volume of liquid with high a concentration of NaCl and can be used for further regeneration of the water softener cation exchange resin as regenerated brine.

It is further desirable to achieve good separation efficiency of the divalent ions at the nanofiltration membrane 66 so that the working capacity for water hardness removal of the cation exchange resin does not decrease with time. It is also desirable to have a good separation (permeation) efficiency of water from the RO-type membrane to avoid the possibility that the brine storage tank 52 overflows with low salt concentration liquid.

In operation, performing separations in a diluted stream loop as illustrated in FIG. 2 allows the nanofiltration membrane 66 to operate more efficiently (i.e., achieve a higher level of separation between monovalent and divalent ions) while avoiding a reduction in the softening capacity of the ion exchange resin bed.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A water softener comprising:
    a cation exchange resin tank fluidly couple for discharging spent brine comprising monovalent and divalent ions;
        a fluid mixer valve couple to the resin tank and to a water tank to dilute the spent brine to a desire concentration of a regenerant salt;
        an ion-separation device fluidly couple to the fluid mixer valve to receive the dilute spent brine and separate the diluted spent brine into first and second streams, the first stream substantially comprising monovalent ions and the second stream substantially comprising divalent ions; and
    a reverse osmosis (RO) membrane fluidly couple to the ion-separation device to receive the first stream from the ion-separation device and produce a concentrate stream of monovalent ions and substantially demineralized water;
    wherein the concentrate stream monovalent ions is collected for reuse as regenerant salt.

2. The water softener of claim 1 wherein the ion-separation device comprises a nanofiltration membrane.

3. The water softener of claim 1 further comprising a tank for the collection of the regenerant salt, wherein the tank is connected to the cation exchange resin tank for regenerating said resin.

4. The water softener of claim 2 wherein the second stream comprises a dischargeable stream comprising hardness-causing ions.

5. The water softener of claim 1 wherein the monovalent ions are selected from the group consisting of sodium and chloride.

6. The water softener of claim 1 wherein the divalent ions are selected from the group consisting of calcium, magnesium and carbonates.

7. The water softener of claim 1 wherein said water from said RO membrane tank is coupled to receive the demineralized water.

8. The water softener of claim 7 wherein said water tank is coupled to the fluid mixer valve to supply water for diluting the spent brine.

9. The water softener of claim 1 further comprises a pump device fluidly coupled to draw liquid through the fluid mixer valve from a spent brine holding tank and said water tank, said liquid to be delivered to the ion-separation device.

10. The water softener of claim 1 wherein said regenerant salt comprises sodium chloride.

11. A method for purifying and recycling spent brine in a water softener, the method comprising:
    discharging from a cation exchange resin tank spent brine comprising monovalent and divalent ions;
    diluting the spent brine to a desired concentration of a regenerant salt;
    separating the diluted spent brine into first and second streams, the first stream substantially comprising a diluted stream of monovalent ions and the second stream substantially comprising divalent ions; and
    filtering said first stream for providing a concentrated stream of monovalent ions and a stream of substantially demineralized water.

12. The method of claim 11 wherein the second stream comprises a dischargeable stream comprising hardness-causing ions and said method further comprises discharging said second stream to a sewer.

13. The method of claim 11 wherein said concentrated stream of monovalent ions comprises a regenerant stream.

14. The water softener of claim 11 wherein said regenerant salt comprises sodium chloride.

* * * * *

UNITED STATES PATENT AND TRADEMARK OFFICE
CERTIFICATE OF CORRECTION

PATENT NO.       : 7,132,052 B2                               Page 1 of 1
APPLICATION NO.  : 10/734485
DATED            : November 7, 2006
INVENTOR(S)      : Rawson et al.

It is certified that error appears in the above-identified patent and that said Letters Patent is hereby corrected as shown below:

Title Pg, Item (73), under "Assignee", in Column 1, Line 2, delete "(JP)" and insert -- NY (US) --, therefor.

In Column 5, Line 14, in Claim 1, delete "couple" and insert -- coupled --, therefor.

In Column 5, Line 17, in Claim 1, delete "couple" and insert -- coupled --, therefor.

In Column 5, Line 18, in Claim 1, delete "desire" and insert -- desired --, therefor.

In Column 5, Line 20, in Claim 1, delete "couple" and insert -- coupled --, therefor.

In Column 5, Line 26, in Claim 1, delete "couple" and insert -- coupled --, therefor.

In Column 5, Line 31, in Claim 1, after "stream" insert -- of --.

In Column 6, Line 7, in Claim 7, between "water" and "tank", delete "from said RO membrane" and after "demineralized water", insert -- from said RO membrane --.

Signed and Sealed this

Eleventh Day of November, 2008

JON W. DUDAS
*Director of the United States Patent and Trademark Office*